(12) United States Patent
Majernik et al.

(10) Patent No.: US 7,946,028 B2
(45) Date of Patent: May 24, 2011

(54) HORIZONTAL ASSEMBLY OF STATOR CORE USING KEYBAR EXTENSIONS

(75) Inventors: Tom Majernik, Pittsburgh, PA (US); James Bauer, Gibsonia, PA (US); Barry Sargeant, Oviedo, FL (US); George Dailey, Pittsburgh, PA (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 12/695,257

(22) Filed: Jan. 28, 2010

(65) Prior Publication Data

US 2010/0115762 A1    May 13, 2010

Related U.S. Application Data

(62) Division of application No. 12/027,543, filed on Feb. 7, 2008, now Pat. No. 7,653,986, which is a division of application No. 11/031,802, filed on Jan. 7, 2005, now Pat. No. 7,353,586.

(60) Provisional application No. 60/565,307, filed on Apr. 26, 2004.

(51) Int. Cl.
*H02K 15/00* (2006.01)
(52) U.S. Cl. .................. 29/732; 29/50; 29/734; 29/759
(58) Field of Classification Search .................. 29/732, 29/50, 596, 598, 609, 734, 759; 310/91, 310/217, 258, 259
See application file for complete search history.

(56) References Cited

U.S. PATENT DOCUMENTS

| | | | |
|---|---|---|---|
| 2,846,603 | A | 8/1958 | Webster et al. |
| 3,787,744 | A | 1/1974 | Saito |
| 4,425,523 | A | 1/1984 | Detinko et al. |
| 4,564,779 | A | 1/1986 | Terry, Jr. |
| 4,916,803 | A | 4/1990 | Estrada |
| 5,136,195 | A | 8/1992 | Allen, III et al. |
| 5,875,540 | A | 3/1999 | Sargeant et al. |
| 5,980,172 | A | 11/1999 | Shoda |
| 6,104,116 | A | 8/2000 | Fuller et al. |
| 6,321,439 | B1 | 11/2001 | Berrong et al. |
| 6,346,760 | B1 | 2/2002 | Boardman, IV |
| 6,441,528 | B1 | 8/2002 | Uchida et al. |
| 6,448,686 | B1 | 9/2002 | Dawson et al. |
| 6,548,928 | B2 | 4/2003 | Walko et al. |
| 6,796,021 | B2 | 9/2004 | Fuller |
| 7,032,289 | B2 | 4/2006 | Oliver et al. |
| 2002/0070629 | A1 | 6/2002 | Dawson et al. |
| 2002/0070631 | A1 | 6/2002 | Dawson et al. |

FOREIGN PATENT DOCUMENTS

| | | |
|---|---|---|
| JP | 60213235 A | 10/1985 |
| JP | 2003070212 A | 3/2003 |
| WO | 0131990 A1 | 5/2001 |

*Primary Examiner* — Thiem Phan

(57) ABSTRACT

The present invention provides an apparatus for the horizontal stacking of laminations 10 and donuts to form a stator core. A stator generator frame 2 has multiple keybars 6 that run the axial length of the frame. The laminations 10 have grooves 12 there-in that engage the keybars to provide a secure fit of the laminations to the generator frame. By extending two or more of the keybars 6, these extensions 7 may be used as rails on which the laminations may be horizontally inserted into the stator frame.

2 Claims, 5 Drawing Sheets

HORIZONTAL ASSEMBLY OF STATOR CORE USING KEYBAR EXTENSIONS

CROSS-REFERENCE TO RELATED APPLICATIONS

This application is a division of U.S. application Ser. No. 12/027,543 filed Feb. 7, 2008 now U.S. Pat. No. 7,653,986 which is a division of application Ser. No. 11/031,802, filed Jan. 7, 2005 now U.S. Pat. No. 7,353,586 which claims the benefit of U.S. Provisional application 60/565,307, filed Apr. 26, 2004. This invention is further related to US applications: Apparatus and Method for the Installation of a Pre-Assembled Stator Core, by Allen, et al.; Method and Apparatus of the Mounting of and Circumferential Displacement of Radial Forces in a Stator Core Assembly, by Sargeant et al.; Horizontal Assembly of Stator Core using a Central Rail Structure by Majernik et al.; all filed herewith and all incorporated herein by reference.

FIELD OF THE INVENTION

The present invention relates to the assembly of generator stator cores. More particularly, the invention relates to the horizontal assembly of a stator core using keybar extensions as rails for the placement of laminations and donuts.

BACKGROUND

The generator stator core is the largest monobloc component in the train of a turbine generator set. Stator cores are manufactured from thousands of thin steel laminations which are stacked, pressed and clamped together into the large cylindrical form of the stator core. Clamping is necessary for several reasons but principally to ensure that geometric form is maintained under the forces imposed during unit operation. Improper clamping can result in lamination vibration during generator operation, due to magnetic impulses and/or core elliptical dilation.

Typically, the stator core is assembled at the final installation site. However, the large size of the stator core results in stator core manufacturing complexities, including the need for generous floor space, high crane requirements, manufacturing lead time and other associated manufacturing difficulties. For example, if the core is stacked directly in the stator frame, the frame must be delivered to the site before any manufacturing steps can occur. Additionally, intermediate core pressing equipment is needed to press and clamp the laminations together at incremental lengths. If, on the other hand, the stator core is manufactured in an external fixture, the external fixture itself adds to the manufacturing costs and requires additional floor space on site and still requires the use of heavy cranes.

U.S. Pat. No. 5,875,540 by Sargeant, which is incorporated herein by reference, overcame some of the problems with the prior art by first assembling a number of laminations into a distinct set, referred to as a donut, and then stacking these donuts to form a stator core. This saved great amounts of assembly time compared to assembling the laminations individually, and produced a stator core with less flaws.

When the individual laminations, or the set of laminations in a donut, are installed into a core, they engage what are referred to as keybars. Keybars are essentially rods that run the internal length of the stator core and provide a hook-in spot for the laminations. FIG. 1 illustrates a stator frame that is empty of any laminations. The keybars 6 run the internal length of the stator frame 2, and are generally attached to the frame through stator support rings 4.

The prior art requires that the laminations and donuts be stacked vertically, using gravity to guide the donuts into place. This can lead to large scale rearrangement and imposition of the stator core and surrounding area for substantial periods of time. Using the prior art, stacking a core horizontally is extremely difficult with lamination aggregates, and large aggregates, such as donuts, is essentially precluded. What is needed is a method and apparatus for stacking laminations and donuts horizontally. This is particularly needed in pre-existing stator frames, not initially designed for such assemblies, where vertical stacking is not practicable and where room is otherwise limited.

SUMMARY OF THE INVENTION

With the foregoing in mind, methods and apparatuses consistent with the present invention facilitate the horizontal stacking of laminations and donuts to form a stator core. A stator generator frame has multiple keybars that run the axial length of the frame. The laminations have grooves there-in that engage the keybars to provide a secure fit of the laminations to the generator frame. By extending two or more of the keybars, these extensions may be used as rails on which the laminations and donuts may be horizontally inserted into the stator frame.

The keybars may be extended by a variety of techniques, such as screw-ins, abutments, scaffolding, tongue and groove etc. The keybar extensions may be placed in a variety of different locations around the stator frame. These extensions therefore may support the laminations from a variety of different positions, such as from below, above, laterally, or combinations thereof.

These and other objects, features, and advantages in accordance with the present invention are provided in one embodiment by a method of horizontally stacking a stator core within a stator frame that comprises extending from the stator frame multiple keybars then mounting the laminations on the extended keybars. The laminations are then slid, or rolled along the keybars into position in the stator frame. The extensions are removed once the laminations are in position within the stator frame.

In a particular embodiment slide pads are placed between laminations and the extended keybars. This allows for the laminations to be more easily slid into position. The slide pads will initially be placed between the laminations and the extended keybars, however, slide pads may also be used on the non-extended keybars, to which the laminations will engage when they are being slid into the stator frame. In certain embodiments the slide pads are removed after the laminations are slid into position.

In another particular embodiment the extending of the multiple of keybars involves two keybars being extended. In a related embodiment, the two keybars are extended from the lower portion of the stator frame, at approximately the 4 and 8 positions or approximately the 5 and 7 positions. These positions refer to the numerical arrangement of a standard clock.

In a further particular embodiment the keybars being extended terminate in a taper, and in another particular embodiment the keybars are of a building-bolt style. The extensions may be, for example, screw-in prosthetics. Laminations may be positioned onto the extended keybars by a variety of techniques, such as by crane, pulley, forklift etc.

BRIEF DESCRIPTION OF THE FIGURES

The invention is explained in more detail by way of example with reference to the following drawings.

DETAILED DESCRIPTION OF THE INVENTION

The present invention comprises a method and apparatus for stacking laminations and donuts horizontally by extending two or more keybars and using the extended keybars as rails to guide the laminations and donuts into position. Stator core donuts have hitherto been stacked vertically, using gravity to guide the donuts into place. There often arises, however, a need to stack the stator core horizontally. This creates problems, since stacking individual laminations is time consuming, while stacking donuts horizontally is next to impossible due to their size and manufacturing variations.

The present invention helps resolve this dilemma by providing keybar extensions that act as rails to slide the laminations and/or donuts into place. Since the keybars are ultimately going to hold the laminations in place in the stator frame, the keybar extensions provide a perfect method of guiding the laminations into position.

The keybar extensions can support the laminations and donuts by a variety of arrangements. A single keybar may act as a rail in some circumstances, though in most embodiments multiple extensions will be used. In particular embodiments, two keybar extensions will be practiced.

The positions of the keybar supports may also be varied. They can support the laminations and donuts from underneath, laterally, above, or in combinations thereof. In practice, the larger stackings, such as donuts, will be supported more from below; while thinner stackings, such as a few laminations or thin rings of laminations, will be supported more from above.

As used herein the term laminations and donuts are used interchangeably to describe aggregates or stackings of laminations in partially assembled form, whether the aggregates are rod-shaped, donut shaped, ring shaped or partial assemblies of the shapes thereof.

Figure 1:
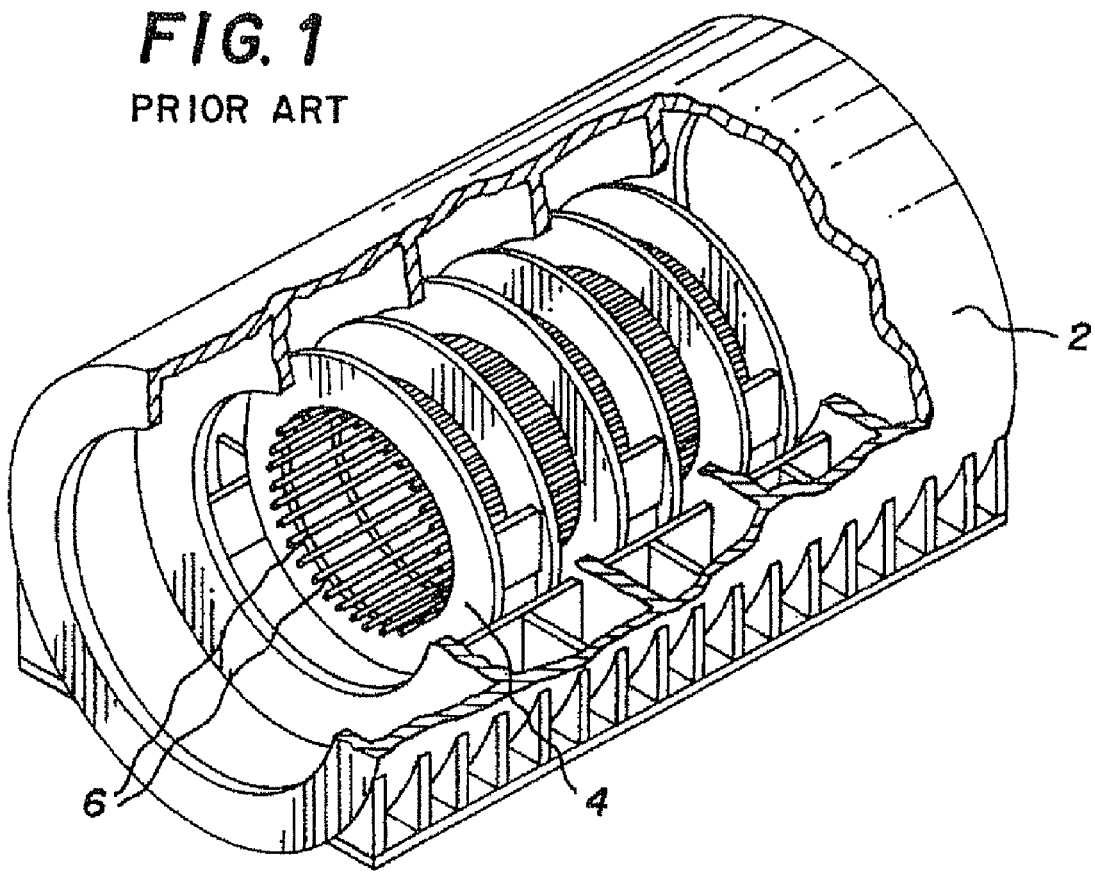
FIG. 1 illustrates a typical stator frame with keybars that has not had the stator core yet assembled.
Figure 2:
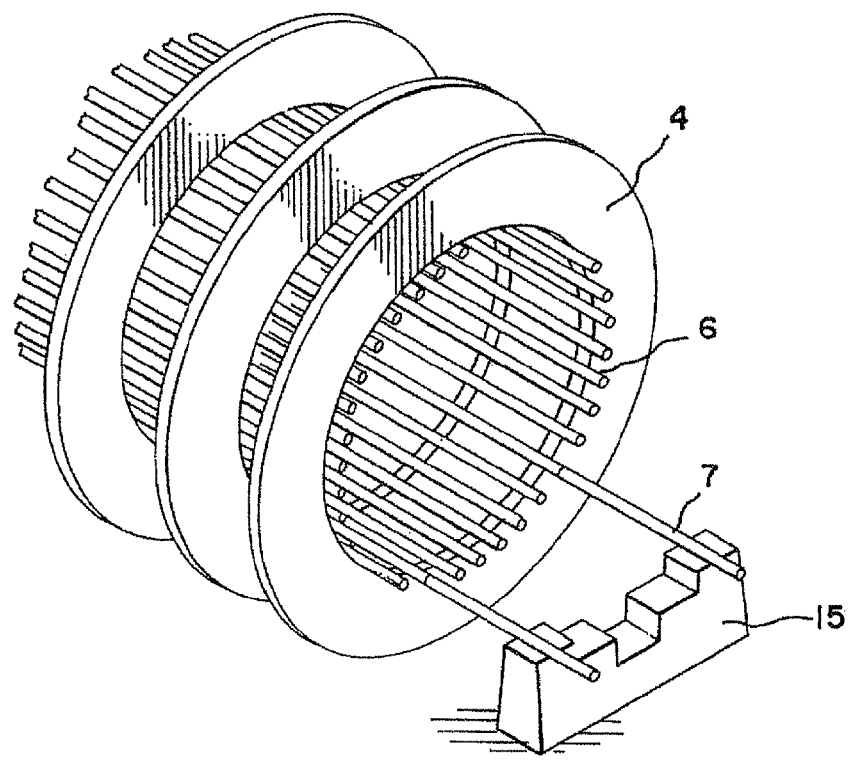
FIG. 2 illustrates the extension of two keybars in accordance with one embodiment of the present invention.

Referring to FIG. 2, one embodiment of the invention is shown. In this embodiment two of the keybars 6, that run the axial length of a stator frame and are attached to support rings 4, have extensions 7 provided thereto. The extensions 7 may be attached to the keybars 6 by a variety of techniques. Some examples of these techniques include screw-ins, abutments, scaffolding, or tongue and groove. In this embodiment, the extensions will support laminations and/or donuts from below and are added at about the 5 and 7 position.

As shown in FIG. 2, keybar extensions may be provided with further support 15. This additional support 15 can prevent warping of the keybars 6 when heavy laminations aggregates and donuts are placed on the extensions 7. The support 15 may also be necessary if the extensions 7 are only weakly attached to the keybars 6.

Figure 3:
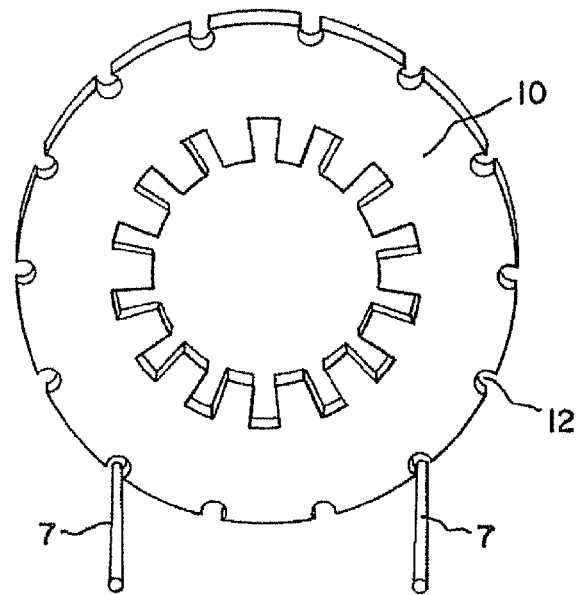
FIG. 3 illustrates the placement of a donut onto two keybar extensions in accordance with one embodiment of the present invention.

FIG. 3 illustrates an end-on view of laminations assembled into a ring like aggregate 10 in place on two keybar extensions 7. Grooves 12 in the laminations engage the extensions 7, thereby aligning the laminations properly with the rest of the stator frame (not shown). Once a lamination set is in place, the application of an axial force will slide or roll the laminations 10 into position within the stator frame.

The laminations or donut may be placed onto the keybar extensions 7 by a variety of methods, such as by manually, or by crane, pulley, forklift etc. This placement method may further be used once the laminations 10 are in position on the extension 7 to provide support and stability while the laminations are being slid into position within the stator frame. Some form of additional support may be necessary if thin aggregates of laminations are being slid into place along the extensions 7. Donuts, which consist of multiple laminations pre-stacked together, are broad, and not prone to tipping over when being slid into position, while only a few laminations stacked together have a much more narrow base, and are more prone to tipping. The additional support, therefore, can prevent tipping and generally ease the placement of the laminations.

Figure 4:
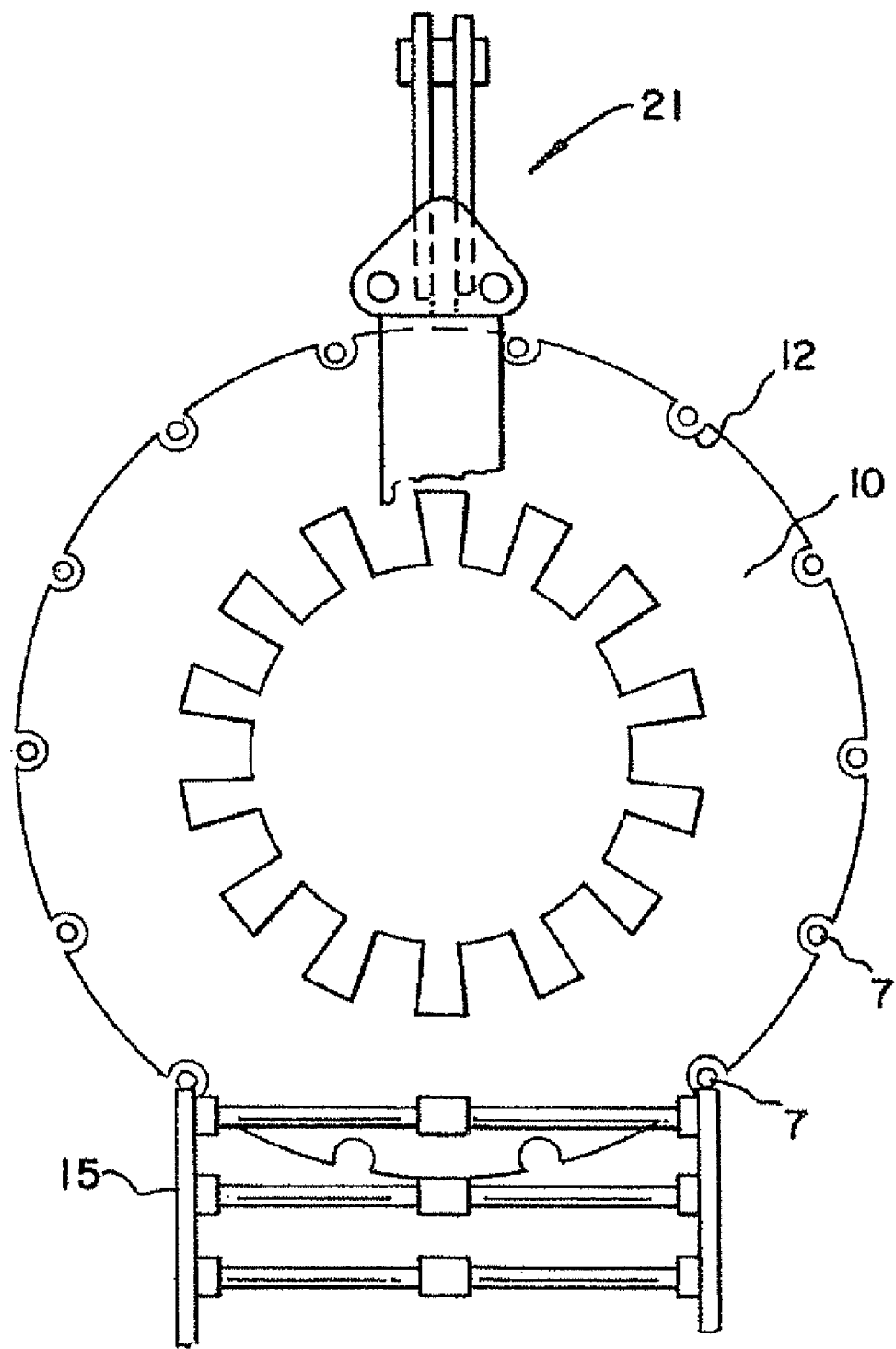
FIG. 4 illustrates the use of a pulley mechanism to place a donut onto keybar extensions in accordance with one embodiment of the present invention.

FIG. 4 illustrates one example of a supporting device. In this embodiment, a pulley mechanism 21 lifts an aggregate of laminations 10 into place over several keybar extensions 7. The pulley 21 will continue to support the laminations 10 as they are being slid along the extensions 7 and into place in the generator. In this embodiment the laminations 10 are being supported by four keybar extensions 7, the lower two of which are supported by additional framework 15. The outer two extensions in this embodiment are still supporting the laminations 10 substantially from below. In other embodiments the extensions are more lateral, and will even support the laminations from above. These embodiments of lateral and upper support will be particularly useful for thinner lamination aggregates, which are more prone to tipping when supported from below.

In some embodiments, the keybar extensions may be tapered, so that the laminations are placed on a more narrow cross section of the keybar extension, and then slid along the expanding section. In the embodiments shown, round building bolt style keybars have been used, however, the invention is equally applicable to dove-tail style keybars, as well as other styles that may be used in the art.

Figure 5:
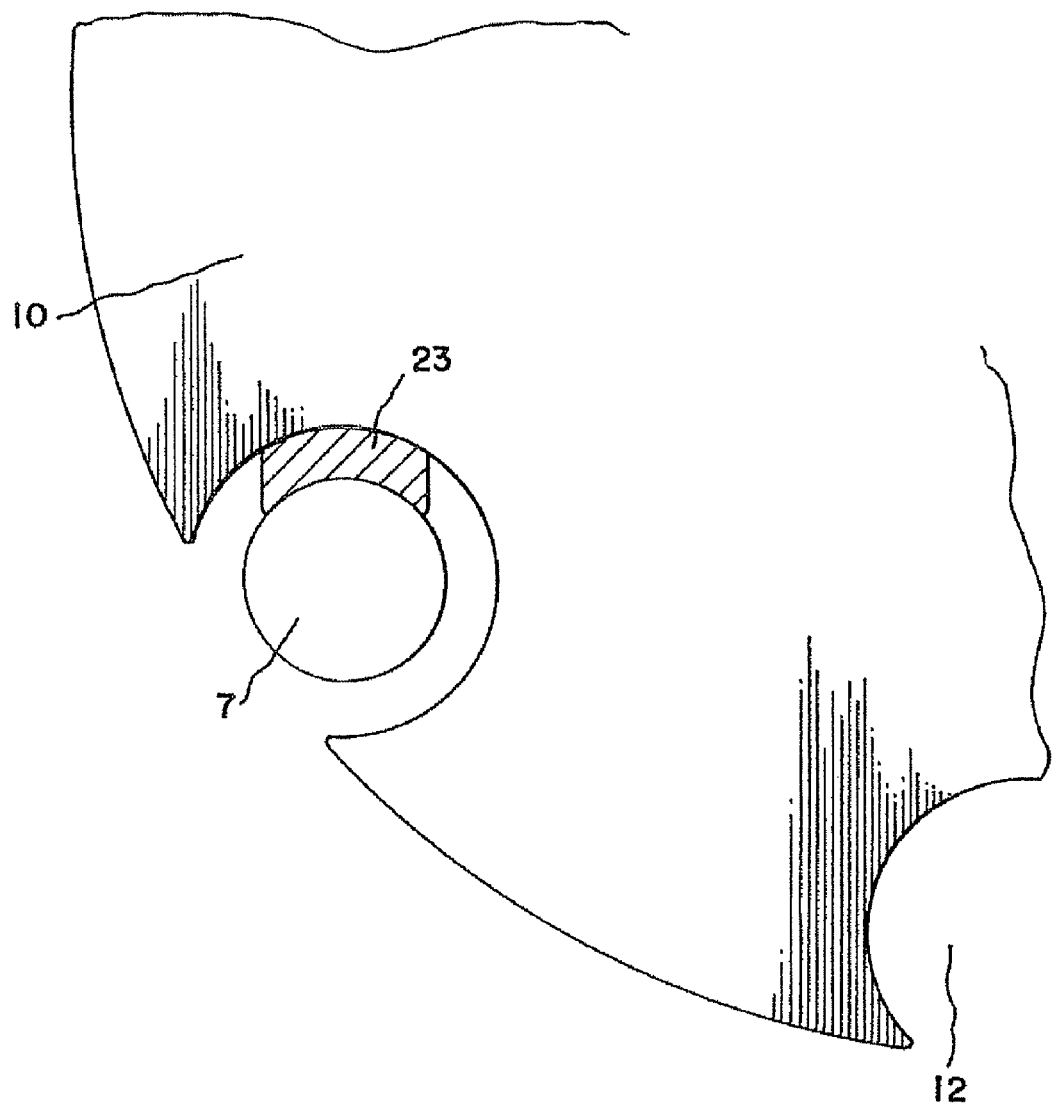
FIG. 5 illustrates the use of a slide pad in accordance with one embodiment of the present invention.

Though the keybars and keybar extension act like rails to guide laminations and donuts into position within the stator frame, friction can still be a problem. To reduce friction and aid in the placement of the laminations, various friction reducing techniques may be used. Some techniques include the use of lubricants. Another technique, as shown in FIG. 5, uses a slide pad 23. The slide pad 23 may be used in a variety of different ways. It may run the length of the keybar and provide a smoother surface on which laminations may be slid, or it may be approximately the size of the laminations and provide a smooth surface visa vie the keybar and slide with the laminations. Once the laminations are in place within the stator frame, the slide pad is optionally removed. The slide pad may be constructed of a variety of different materials, such as metals, plastics and composites, and may have coatings such as Teflon™ for decreased friction on one side, and an abrasive for increased friction on the other side.

In the figures the keybar extensions are shown as being roughly of equal length. It may be desired, however, that the extensions are of different lengths. The laminations may engage additional extensions as it is being slid into the stator frame to aid in its positioning.

Figure 6:
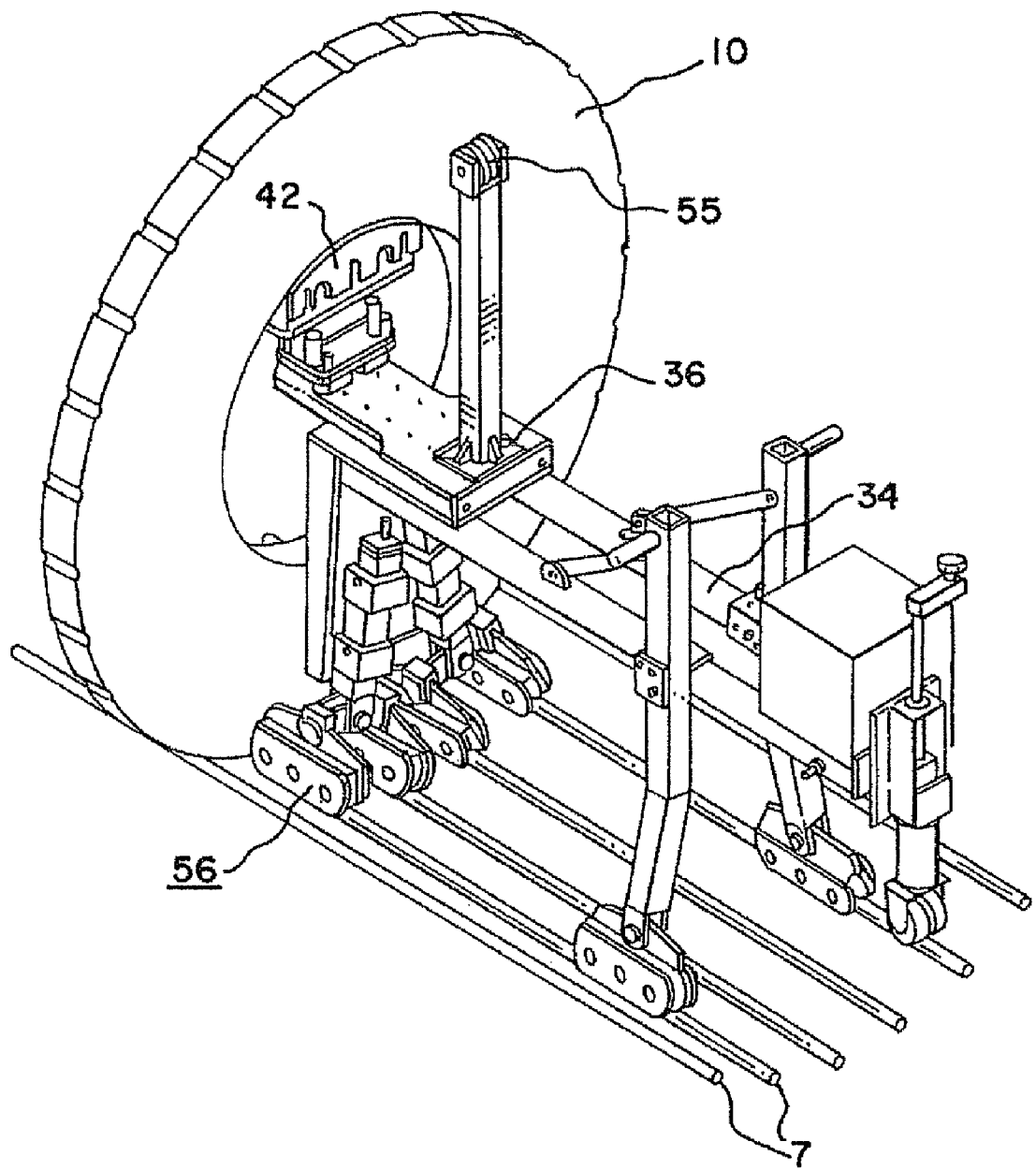
FIG. 6 illustrates an embodiment of the present invention where a central rail structure is used in combination with the keybar extension.

Referring to FIG. 6, an embodiment of the present invention using keybar extensions 7 in conjunction with a central rail structure 34 is illustrated. In this embodiment laminations 7 are not only supported by the keybar extensions, it is further supported by a dolly 36 that is disposed atop of the central rail structure 34. The dolly will have some mechanism for supporting the upper inner diameter of the laminations, such as a tailored saddle 42. The dolly 36 in this embodiment also has a built in pulley device 55 to assist in the placement of the lamination. The dolly itself may move one said central rail structure by a variety of means, including wheels, roller bearings and similar mechanisms.

The central rail structure may be supported by a variety of techniques, such as by legs, wheels and cables. In the embodiment shown in FIG. 6, the central rail structure 34 is supported by wheels 56 that run on the keybar extensions 7. This provides an extra option of movement. The entire central rail structure may be moved along the axial length of the stator frame, or optionally just the dolly may be moved atop of the central rail structure, or a combination of the two. In the embodiment shown, the central rail structure is of limited length. In other embodiments the central rail structure is longer, even running the entire length of the stator frame or more. In particular embodiments, persons involved in operating the invention control the dolly remote from the zone around the lamination for safety purposes.

In one embodiment, the present invention provides for a method of horizontally stacking a stator core within a stator frame that comprises extending from the stator frame multiple keybars then mounting the laminations on the extended keybars. The laminations are then slid along the keybars into position in the stator core. The extensions are removed once the laminations are in position within the stator frame.

In a particular embodiment slide pads are placed between laminations and the extended keybars. This allows for the laminations to be more easily slid into position. The slide pads will initially be placed between the laminations and the extended keybars, however, slide pads may also be used on the non-extended keybars, to which the laminations will engage when they are being slid into the stator frame. In certain embodiments the slide pads are removed after the laminations are slid into position.

In another particular embodiment the extending of the multiple of keybars involves two keybars being extended. In a related embodiment, the two keybars are extended from the lower portion of the stator frame, at approximately the 4 and 8 positions or approximately the 5 and 7 positions. These positions refer to the numerical arrangement of a standard clock.

In a further particular embodiment the keybars being extended terminate in a taper. And in another particular embodiment the keybars are of a building-bolt style. The extensions may be, for example, screw-in prosthetics. Laminations may be positioned onto the extended keybars by a variety of techniques, such as by crane, pulley and forklift.

In another embodiment of the present invention, a method of horizontally assembling a stator core within a stator frame is provided. This method comprises providing at least two keybar extensions and multiple keybars that are part of a stator frame. The keybar extensions are attached to keybars that are part of the stator frame. These keybar extensions may be supported by an external member, such as a resting block or scaffolding. Donuts, which are pre-stacked groups of laminations, are placed onto the keybar extensions and slid along the extensions such that grooves in the donuts engage the keybars. The donut is then positioned within the stator frame.

One or more donuts may be added to the stator frame in this manner. The stator core may even be assembled in this manner from both ends of the stator core, which may even be done simultaneously.

In another embodiment of the present invention a method for horizontally assembling a stator core is provided. This method comprises providing at least four keybar extensions and multiple keybars. The keybars are part of a stator frame, and the stator frame has two ends. At a first end, two of the at least four keybar extensions are attached to two of the keybars. A first donut is then placed onto the two keybar extensions along with a first pair of slide pads that are set between the first lamination donut and the at least two keybar extensions. The donut is then slid along the two keybar extensions such that the first lamination donut engages all of the keybars. The donut is then properly positioned within the stator frame. On the other side of the stator frame a second two of the at least four keybar extensions are attached to keybars. Either separately or simultaneously with the first donut, a second donut is placed on the second two keybar extensions and a second pair of slide pads are set between the second lamination donut and the extensions. The second donut is then slid along the extension such that the second lamination donut engages all of the keybars. The second donut is then positioned within the stator frame. On both ends, the keybar extensions are attached to the keybars on the lower portion of the stator frame. This method may be repeated on either or both ends of the stator frame.

In one embodiment additional keybar extensions are positioned more along the sides of the stator frame. This provides more lateral support for the donuts.

In another embodiment the present invention provides for an apparatus for horizontally assembling a stator core. This apparatus comprises multiple keybars that are part of a stator frame, and multiple keybar extensions that are attached to some of the keybars at one end of the stator frame. A central rail structure is supported by the keybar extensions, and a dolly is disposed on top of the central rail structure. Laminations, whether in the form of individual laminations or aggregate sets, are placed on the apparatus and engage the dolly on the upper inner diameter of the laminations and also engage the keybar extensions on the outer diameter of the laminations.

The segmented ring to which the rail structure and/or keybars are bolted has duality of purpose. The segmented ring is segmented into four sections for ease of assembly and disassembly, the top three segments being of lightweight alloy, such as aluminum, and the bottom segment of a structural steel. The segments are bolted together and are affixed to the frame structure by means such as jack bolts. The ring also provides for adjustments to the alignment of the generator building bolts, each building bolt being separately adjustable in spatial orientation by way of a multiplicity of jack bolts, approximately six per building bolt. By adjusting the individual jack bolts the positions of the ends of the building bolts may be adjusted so as to facilitate the reinstallation of the stator core plate, which has very tight tolerances with respect to the building bolts. After the stator core plate is partially installed on the building bolts, the aforementioned segments ring and jack bolts can be removed easily and quickly, which then allows to stator core plate to advance to its final position.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. An apparatus for horizontally assembling a stator core comprising:
    a plurality of keybar extensions comprising at least one of a screw-in prosthetic and a tongue in groove prosthetic;
    a plurality of keybars, wherein said plurality of keybars are part of a stator frame, wherein said stator frame has two ends and wherein said plurality of keybar extensions are attached at a first end of said stator frame to at least two of said plurality of keybars; and
    a plurality of slide pads disposed on top of respective ones of the plurality of keybar extensions;
    wherein laminations placed on said apparatus engage said slide pads on the outer diameter of the laminations.

2. The apparatus of claim 1, wherein the laminations comprise a lamination donut.

* * * * *